United States Patent
Boseman et al.

(10) Patent No.: US 9,144,852 B2
(45) Date of Patent: Sep. 29, 2015

(54) TABLE SAW BLADE DRIVING MECHANISM

(71) Applicants: Mark Fianza Boseman, Suffolk, VA (US); John Fianza Boseman, Suffolk, VA (US)

(72) Inventors: Mark Fianza Boseman, Suffolk, VA (US); John Fianza Boseman, Suffolk, VA (US)

( * ) Notice: Subject to any disclaimer, the term of this patent is extended or adjusted under 35 U.S.C. 154(b) by 194 days.

(21) Appl. No.: 13/931,871

(22) Filed: Jun. 29, 2013

(65) Prior Publication Data

US 2015/0000492 A1 Jan. 1, 2015

(51) Int. Cl.
*B23D 45/06* (2006.01)
*B27B 5/24* (2006.01)

(52) U.S. Cl.
CPC ............ *B23D 45/066* (2013.01); *B23D 45/067* (2013.01); *B27B 5/243* (2013.01); *Y10T 83/7697* (2015.04)

(58) Field of Classification Search
CPC .... B27G 19/02; B23D 45/065; B23D 45/066; B23D 45/067; B27B 5/24; B27B 5/243
USPC ............... 83/471.2, 471.3, 472, 473, 477.1, 83/477.2, 478, 487, 489
See application file for complete search history.

(56) References Cited

U.S. PATENT DOCUMENTS

| | | | | |
|---|---|---|---|---|
| 3,483,784 A | * | 12/1969 | Kaiser | 83/215 |
| 2008/0078276 A1 | * | 4/2008 | Benuzzi | 83/109 |
| 2010/0050843 A1 | * | 3/2010 | Gass et al. | 83/477.1 |

* cited by examiner

*Primary Examiner* — Sarah B McPartlin (57) ABSTRACT

An improved adjustable blade height and driving mechanism for a table saw, wherein the design is compact and the weight of the drive motor is not an applied load upon the operator rotating a hand crank or upon an actuating motor. The table saw comprises a main frame and a saw blade mounted to and driven by a belt driving mechanism comprising a pivotable frame that is pivotable about an axis parallel to the saw cutting axis, an electrical motor mounted stationary to the pivotable frame, and a blade height adjusting device to raise and lower the blade wheel relative to the work-piece support surface while the electric drive motor remains stationary.

14 Claims, 9 Drawing Sheets

TABLE SAW BLADE DRIVING MECHANISM

BACKGROUND

Prior Art

Belt driven devices that require variable height adjusting mechanisms such as those found in table saws are commonly configured whereby the drive motor and driven component are adjustably raised or lowered together by a hand crank or by an actuating electric motor. For applications that require the driven component to be driven at high torque and high speed, high powered motors that are typically heavy are used. Accordingly, the mechanism for raising and lowering the drive motor must overcome the heavy weight of the motor through either a high torque actuating motor or for the user to exert substantial effort when using a hand crank. The disadvantage of current belt driven configurations is further exacerbated by the large space required for the traditional arrangement of a belt driven device with an adjustable height feature. For applications where compactness is required, such as for portable equipment, the traditional belt drive configuration can be limiting if not impractical. It would be therefore advantageous to have a compact motor and belt arrangement where the weight of the motor is not an applied load on the actuator or on the operator turning the hand crank while raising and lowering the saw blade. A configuration where the motor is stationary but allows the driven component to be adjustably raised and lowered so that weight of the motor is not carried by the actuating mechanism allows the use of smaller, light weight, and inexpensive materials.

SUMMARY

The object of the present invention is to overcome the above inadequacies by providing an improved adjustable blade height and driving mechanism through a compact arrangement whereby the drive motor is stationary in relation to the blade and the drive motor's weight is not an applied load on an operator turning a hand crank or on an actuating motor when raising or lowering the blade. The blade height and driving mechanism is simple in structure which allows for low manufacturing cost and is convenient to adjust and operate.

To achieve the object, the present embodiment provides a blade height and driving mechanism for a table saw, wherein the table saw comprises a main frame assembly, a work-piece support platform mounted to the mainframe assembly and a saw slot and saw slot axis; a blade wheel mounted to and driven by a blade driving mechanism disposed under the work-piece support surface.

The blade driving mechanism comprising a pivotal frame that is pivotable about an axis that is generally parallel to the saw slot axis, an electrical motor mounted substantially stationary to the pivotable frame, and an electrical motor having a drive pulley mounted to its output shaft. A belt driving system comprising a blade arm with a blade pulley rotatably mounted about an axis with the blade pulley connected to the blade wheel for driving the blade wheel to rotate, the blade arm pivotable about a pivot axis that is affixed to the pivotable frame; a counter arm having a counter pulley rotably mounted about an axis with the counter arm mounted coaxially with the blade arm and pivotable about the axis point; a drive belt interconnected to a drive pulley, the blade pulley, and the counter pulley.

The blade height adjusting device is configured to raise and lower the blade wheel relative to the work-piece support surface. Preferably, the height adjusting device comprises a worm gear assembly configured to rotate the blade arm about its pivot axis to raise and lower the blade wheel, a gear of the worm gear assembly is attached to the blade arm, coaxially mounted to the pivot axis, such that the blade arm and gear rotate together, a worm of the worm gear assembly is operatively coupled to and driven by a motor that is controllable via a control panel.

Preferably, the blade driving mechanism wherein a line passing through the blade arm pivot axis and blade pulley axis forms an angle with a line passing through the counter arm pivot axis and counter pulley axis with an angle almost equal to 90 degrees. The distance between the blade arm pivot axis and blade pulley axis is generally equal to a distance between the counter arm pivot axis and counter pulley axis. The blade arm and counter arm are configured to cooperatively rotate in unison such that when rotating the blade arm to raise the blade wheel, the blade pulley takes up additional slack in the drive belt extending from the drive pulley towards the blade pulley and the counter arm rotates to simultaneously counteract the effects of the blade pulley displacement on the drive belt by giving up slack in the drive belt extending from the drive pulley towards the counter pulley. When rotating the blade arm to lower the blade wheel, the blade pulley give ups lack in the drive belt extending from the drive pulley towards the blade pulley and the counter arm rotates to simultaneously counteract the effects of the blade pulley displacement on the drive belt by taking up additional slack in the drive belt extending from the drive pulley towards the counter pulley. The blade arm and counter arm are spring-biased which caused the blade arm to apply an opposing force against the counter arm.

Using the adjustable blade height and driving mechanism described herein, the height of the saw blade can be adjusted easily with minimal force when compared to traditional table saw designs because the motor is stationary and its' weight is not a burden when adjusting the blade height. The adjustable blade height driving mechanism of the invention is also compact and may be used in various table saws for the shop or for the work site where a portable design is best suited.

DRAWINGS—FIGURES

The foregoing aspects and many of the attendant advantages of this invention will become better understood by reference to the following detailed description, when taken in conjunction with the accompanying drawings, wherein.

DESCRIPTION OF THE INVENTION

Figure 1:
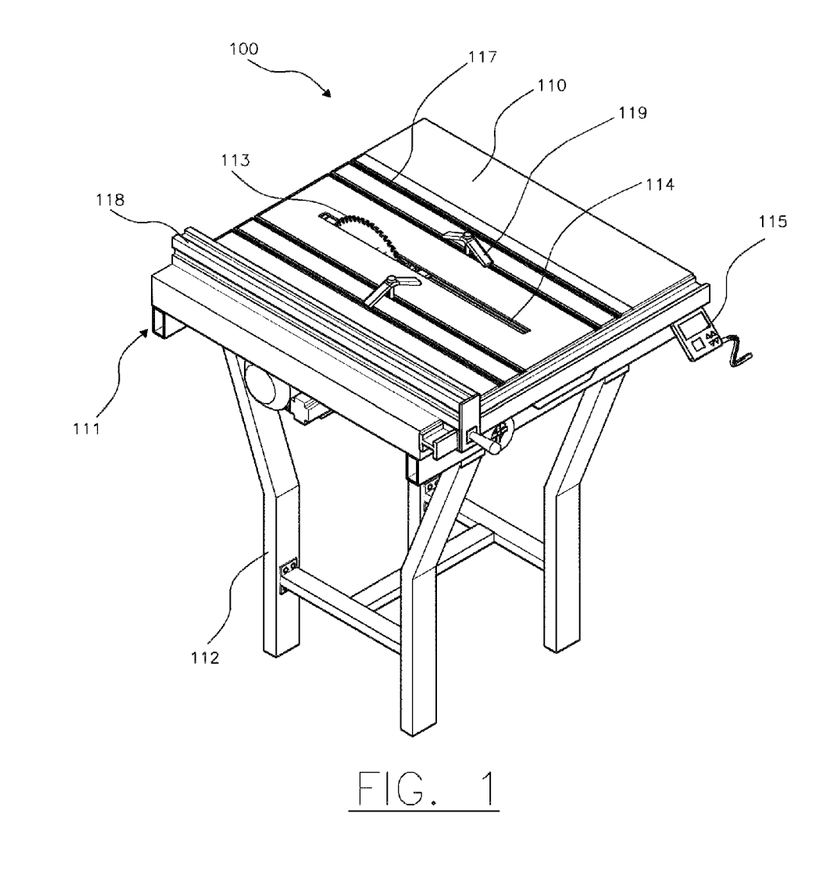
FIG. 1 is an isometric view of a table saw with a traversing blade constructed in accordance with one embodiment of the present disclosure.

FIG. 1 illustrates one suitable embodiment of a table saw 100 constructed in accordance with aspects of the present disclosure. The table saw 100 has a work-piece support platform 110, a main frame assembly 111 adapted to support the work-piece support platform 110, a plurality of support legs 112 adapted to support the main frame 111, and a blade wheel 113. The blade wheel 113 is translatable to a plurality of raised positions in the vertical direction relative to the work-piece support platform 110 and traversable to a plurality of positions in the horizontal direction generally parallel to the work-piece support platform 110 along a slotted hole 114. A control panel 115 enables an operator to control the vertical, horizontal, and angular translations of the blade wheel 113 relative to the work-piece support platform 110. The control panel 115 is mounted on the main frame assembly 111 and can easily be attached and detached, so that the user can operated the blade movements anywhere around the table saw 100.

Figure 2:
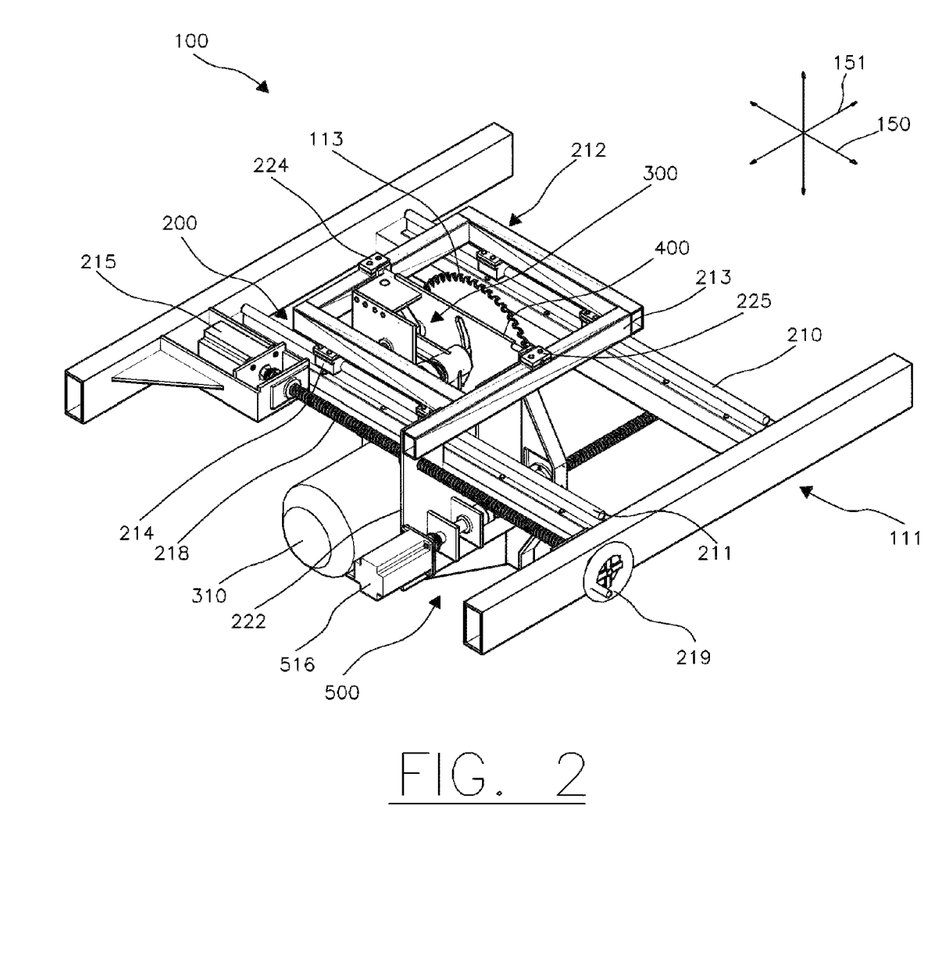
FIG. 2 is an isometric view of one suitable embodiment of the traversing mechanism, blade driving mechanism, and tilting mechanism of the table saw shown in FIG. 1.

The blade driving mechanism 300 will be shown as part of a table saw with a traversing mechanism 200 to show the reader how the compact arrangement of the blade driving mechanism 300 can easily be integrated into various cutting apparatuses. The components of the table saw 100 that drives the blade wheel 113 to rotate and provide the means to translate the blade wheel 113 in the vertical and angular directions are disposed under the work-piece support platform 110. To that end, please refer now to FIG. 2 where the table saw 100 is shown with the work-piece support platform 110 and support legs 112 removed. The table saw 100 comprises the traversing mechanism 200 for translating the blade wheel in the lateral direction 150, the blade driving mechanism 300 used to rotate the blade wheel 113, a height adjusting device 350 (see FIG. 4) for vertically translating the blade wheel 113 relative to the work-piece support platform 110, a tilt frame 400 for supporting various parts of the blade driving mechanism 300 and height adjusting device 350, and a tilting mechanism 500 for angularly positioning the blade wheel 113 relative to the work-piece support platform 110.

Figure 3:
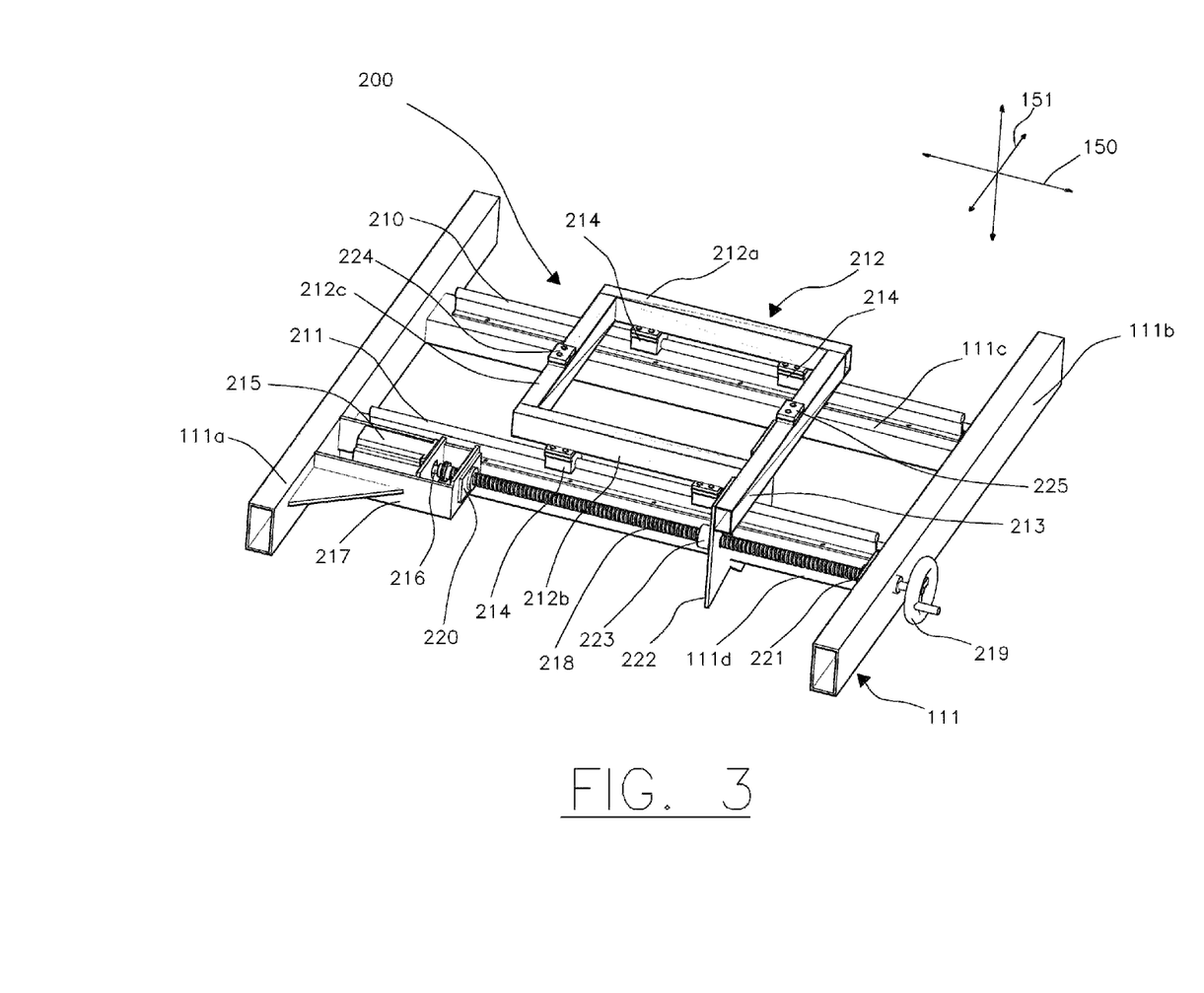
FIG. 3 is a perspective view of one suitable embodiment of a traversing mechanism of the table saw shown in FIG. 1.

Referring now to FIG. 3, the figure illustrates the assembly of the traversing mechanism 200 (blade driving mechanism 300, tilt frame 400, and tilting mechanism are not shown for the purpose of clarity). The main frame assembly 111 is composed of longitudinal members 111a, 111b that extend in the longitudinal direction 151 and lateral members 111c, 111d that extend in the lateral direction 150. The longitudinal members 111a and 111b are spaced apart in the lateral direction 150 and the lateral members 111c and 111d are spaced apart in the longitudinal direction 151. The lateral members 111c and 111d are fixedly attached by fasteners, welding or any other suitable means to the longitudinal members 111a and 111b.

The main frame lateral members 111c and 111d form the bases of the linear guide rails 210 and 211 for the traversing mechanism 200. The linear guide rails 210 and 211 are rigidly attached to the main frame lateral members 111c and 111d, respectively, and are configured generally parallel to the lateral direction 150.

The traversing mechanism 200 further includes a carriage assembly 212 slidably coupled to the linear guide rails 210 and 211 via a plurality of linear bearings 214, a traversing motor 215 mounted to a traversing motor mounting frame 217 that is fixedly attached to the main frame longitudinal member 111a, a traversing threaded rod 218 coupled to a traversing motor output shaft 216 on one of its ends and coupled to a traversing hand wheel 219 on its other end, shaft mount bearings 220 and 221 for supporting the traversing threaded rod 218, a vertical support plate 222 attached to a carriage extended member 213, and a traversing nut 223 fastened to the vertical support plate 222 and threadably engaged with the traversing threaded rod 218.

The carriage assembly 212 is composed of a longitudinal member 212c and extended member 213 that extend in the longitudinal direction 151 and lateral members 212a and 212b that extend in the lateral direction 150. The main frame assembly 111 and the carriage assembly 212 are configured and sized to allow the tilt frame 400 (shown in FIG. 4) and its attached assemblies to translate laterally and angularly without coming into contact with the main frame assembly 111 in its predetermined range of motion.

Also, as shown best in FIG. 3, the ends of the guide rails 210 and 211 terminates to a point before the main frame longitudinal members 111a and 111b to provide enough space in between the ends of the guide rails 210, 211 and the main frame longitudinal members 111a, 111b to facilitate installation or replacement of linear bearings 214.

In operation, the traversing motor 215 rotates the traversing threaded rod 218, which in turn, moves the traversing nut 223. The traversing motor 215 is selectively reversible so that the traversing threaded rod 218 can be rotated in either direction, thereby allowing the traversing nut 223 to transmit an actuating force on the vertical support plate 222, that is attached to the carriage extended member 213, to advance and retreat the carriage assembly 212 to a plurality of positions along the linear guide rails 210 and 211. Alternatively, the traversing hand wheel 219 can be used to rotate the traversing threaded rod 218 to move the carriage assembly 212, as the user desires. The traversing threaded rod 218 and traversing nut 223 acts like a jack screw, thereby, when the traversing motor 215 is in stop, it holds the carriage assembly 212 firmly in position.

The linear actuator for traversing the carriage assembly 212 is shown as a threaded rod linear actuator and a nut. While the linear actuator is shown as threaded rod linear actuator, it may be any type of closed length linear actuator that can be attached to frame assembly 111 at both ends and can allow the carriage assembly 212 to translate linearly, including, for example, nut and screw, acme threaded rod, linear ball screw, linear track, rack and pinion, or linear slide. The traversing mechanism 200 may include two linear actuators of the same type, or each actuator may be of a different type.

Figure 4:
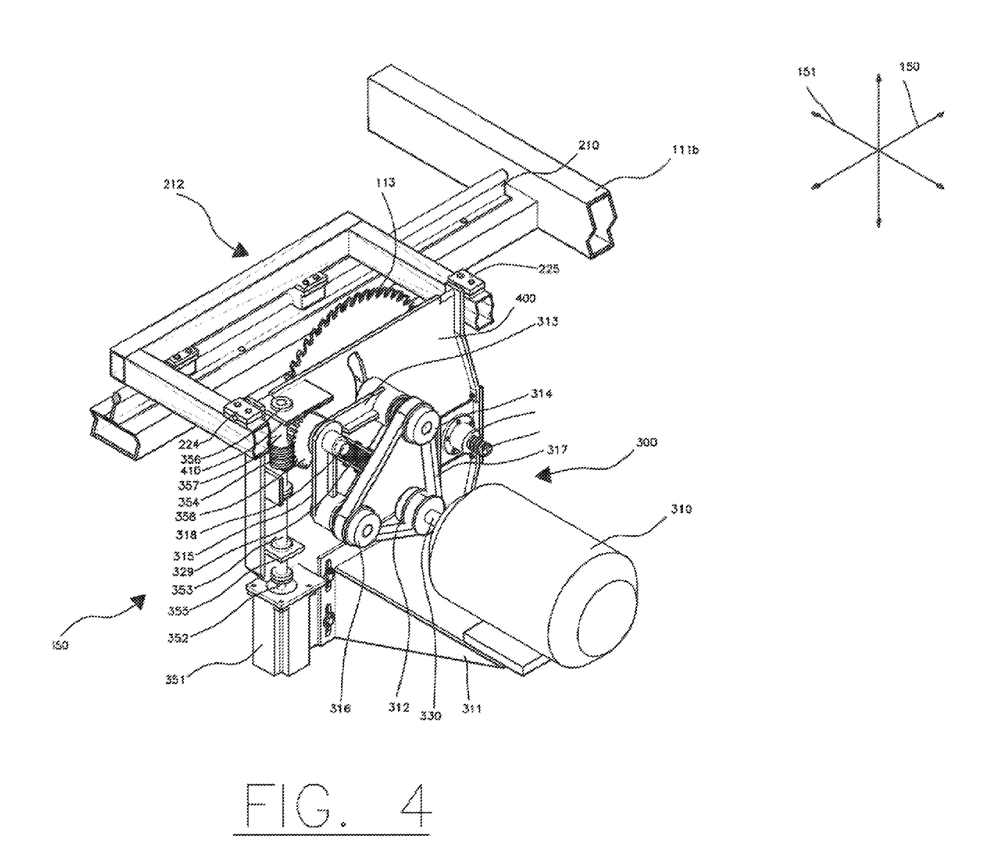
FIG. 4 is a partial isometric view of one embodiment of the blade drive assembly of the table saw shown in FIG. 1.

Referring now to FIG. 4, the blade driving mechanism 300 is mounted to the tilt frame 400 as seen from another direction. The blade driving mechanism 300 includes a blade driving motor 310 mounted to the tilt frame 400 via a blade drive motor mounting base 311, a drive pulley 312 mounted to the blade driving motor output shaft 330, a blade arm 313 supporting a blade pulley 314, a counter arm 315 supporting a counter pulley 316, and a drive belt 317 wound around the drive pulley 312, the blade pulley 314, and the counter pulley 316.

The blade height adjusting device 350 is used to translate the blade wheel 113 from a stowed position to a plurality of raised positions relative to the work-piece support platform 110 (see FIG. 1). The blade height adjusting device 350 includes a height adjusting motor 351, an intermediate shaft 353 coupled to the height adjusting motor output shaft 352, a worm 354 operatively coupled to the height adjusting motor output shaft 352 via the intermediate shaft 353, a shaft mount 355 for supporting the intermediate shaft 353, a shaft mount 356 integrated to the bracket 410 for supporting one end of the worm shaft 357, and a worm gear 358 fixedly attached to the blade arm 313 and engaged with the worm 354.

Accordingly, the reader will see that the carriage assembly 212 is the framework that supports the tilt frame 400, which the blade driving mechanism 300 and the height adjusting device 350 are mounted to. The tilt plate 400 is pivotably mounted to the carriage via pivot blocks 224 and 225 and pivot about an axis generally parallel to the guide rails 210 and 211.

Figure 5:
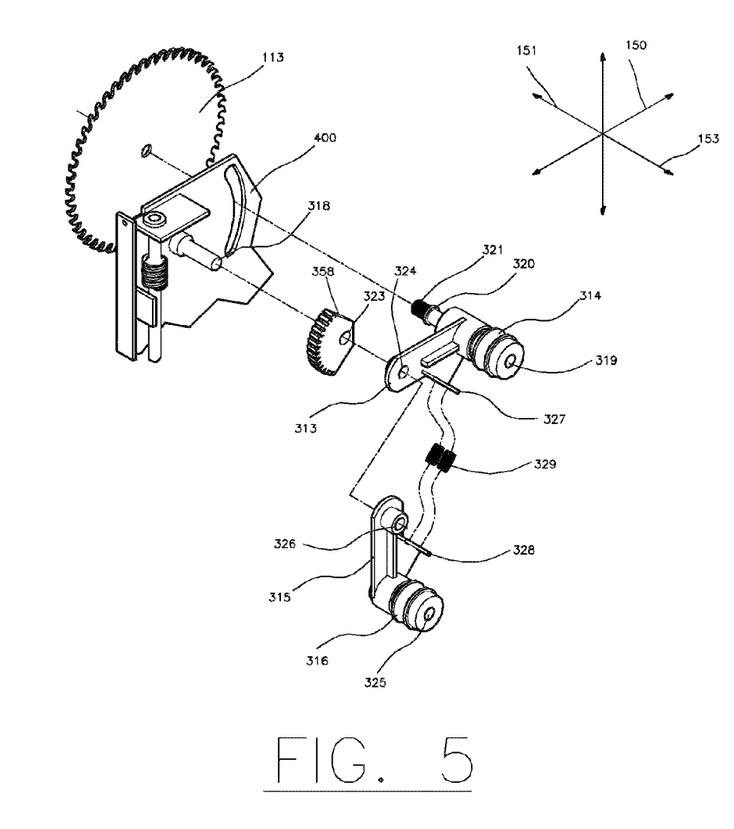
FIG. 5 is a so-called exploded view of the blade arm and counter arm of the blade drive assembly shown in FIG. 4.

In accordance with the aspects of the present disclosure, the blade arm 313 and counter arm 315 are configured to ensure a sufficient wrap-around frictional engagement of the drive belt 317 to the pulleys when adjusting the height of the blade wheel 113 between at least a raised position and a stowed position. To that end, please refer to FIG. 5 where the configuration of the blade arm 313 and counter arm 315 will be described in greater detail. As best shown in FIG. 5, the blade arm 313 includes a blade shaft 319 rotationally coupled to the blade arm 313. The blade pulley 314 is coupled to the non-threaded end of the blade shaft 319. The blade shaft 319 includes a collar 320 integrated to the blade shaft 319 to axially retain the blade wheel 113 from moving in the longitudinal direction 153 and has a threaded end 321 sized to threadably receive a blade wheel nut (not shown) to retain the blade wheel 113 from moving in the longitudinal direction 151. When the worm gear 358 is attached to the blade arm 313, the hole 323 of the worm gear 358 coaxially aligns with the hole 324 of the blade arm 313. The blade arm 313 and worm gear 358 are coaxially mounted to the axle 318 and pivot about an axis generally perpendicular to the face of the tilt frame 400.

The counter arm 315 includes a counter pulley shaft 325 rotationally coupled to the counter arm 315 and a counter pulley 316 is fastened to the counter arm shaft 325. The counter arm 315 has a hole 326 sized to axially fit the axle 318 and cooperatively pivot with the blade arm 313.

The blade arm 313 has a lip 327 that extends from a vertical face of the blade arm 313. The lip 327 is oriented in a generally diagonal direction. Similar to the blade arm 313, the counter arm 315 also has a lip 328 and oriented in the same manner. The lip 327 and lip 328 face each other and are sized and spaced to receive springs 329 to bias the blade arm 313 and counter arm 315, in an opposing manner, causing the blade arm 313 to apply a compressive force against the counter arm 315. Each spring 329 is fastened to lip 327 on one end and fastened to lip 328 on its other end, preferably by fasteners. As shown best in FIG. 4, the blade arm 313 and counter arm 315 forms a generally L-shaped member, where each leg has generally the same length. The springs 329 provides the belt drive system with enhanced stabilization and tensioning by compensating for misalignment and belt lengthening. The blade arm 313 and counter arm configuration also facilitates the installation and removal of the drive belt 317 (see FIG. 4) during assembly or servicing, where the user can push the counter arm 315 towards the blade arm 313 to loosen the wrap-around engagement of the drive belt 317 and thereby allow for installation or replacement.

In operation, as depicted in FIGS. 4-5, the user employing the tool energizes the blade driving motor 310 via the control panel 115 (see FIG. 1). As the blade driving motor 310 rotates the drive pulley 312, the drive belt 317 causes the blade pulley 314 to rotate and thereby rotate the blade wheel 113 via the blade shaft 319. In adjusting the height of the blade wheel 113, the user energizes the height adjusting motor 351 via the control panel 115 (see FIG. 1), which in turn, rotates the worm 354 via the intermediate shaft 353. As the worm 354 rotates, the threads of the worm 354 engaged with the teeth of the worm gear 358 will cause the worm gear 358 to rotate. The height adjusting motor 351 is selectively reversible so that the worm 354 can be rotated in either direction. Since the worm gear 358 is fixedly attached to the blade arm 313, the blade arm 313 will rotate in unison with the worm gear 358 and thereby raise or lower the blade wheel 113, depending on the direction of rotation of the height adjusting motor 351.

Figure 6A:
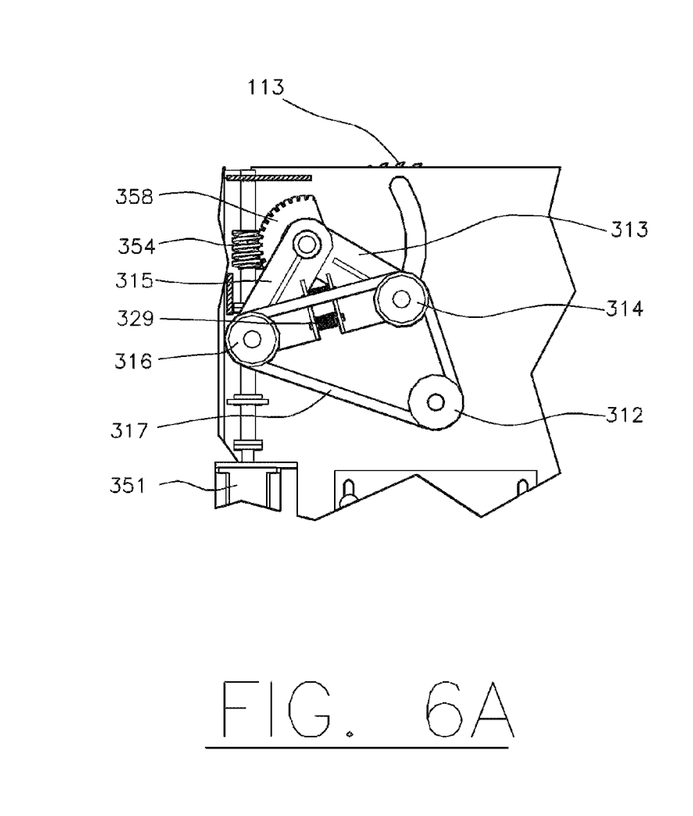
FIG. 6A is a partial side view of one suitable embodiment of the blade arm and counter arm configuration, wherein the blade wheel is in the lowered position.

With the blade driving motor 310 remaining substantially stationary relative to the tilt frame 400, the blade arm 313 and counter arm 315 are configured to turn in unison such that, as shown in FIG. 6A, when the blade wheel 113 is initially in the stowed position, when the user energizes the height adjusting motor 351 to raise the blade wheel 113, the blade arm 313 will rotate in the counter clockwise direction causing the blade wheel 113 to rise. The upward swing motion of the blade arm 313 causes the blade pulley 314 to takes up additional slack in the drive belt 317 extending from the drive pulley 312 towards the blade pulley 314 and the counter arm 315 rotates to simultaneously counteract the effects of the blade pulley 314 displacement on the drive belt 317 by giving up slack in the drive belt 317 extending from the drive pulley 312 towards the counter pulley 316.

Figure 6B:
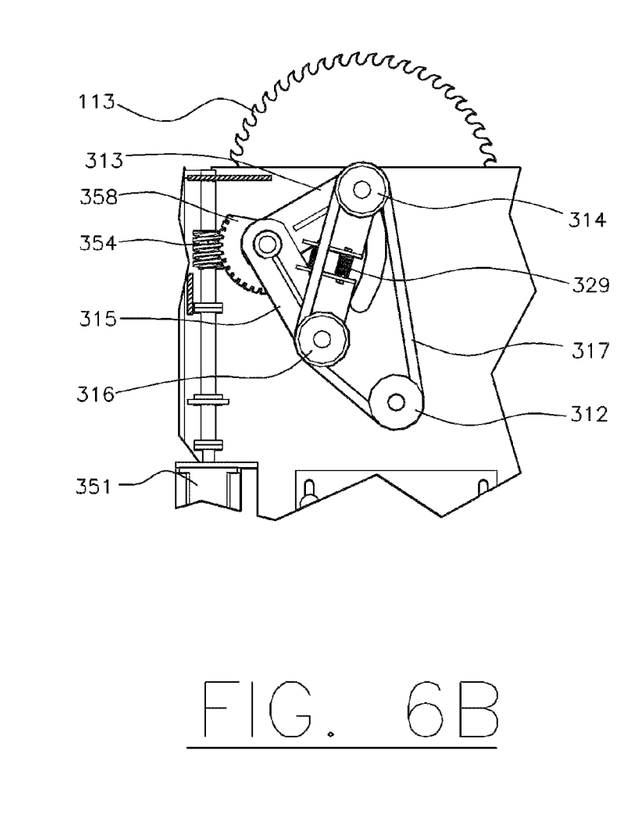
FIG. 6B is a partial side view of one suitable embodiment of the blade arm and counter arm configuration, wherein the blade wheel is raised to its maximum height.

As shown in FIG. 6B, the blade wheel 113 is raised to its maximum height. In lowering the blade wheel 113, the user energizes the height adjusting motor 351 to rotate the blade arm 313 in the clockwise direction. The downward swing motion of the blade arm 313 causes the blade pulley 314 to give up slack in the drive belt 317 extending from the drive pulley 312 towards the blade pulley 314 and the counter arm 315 rotates to simultaneously counteract the effects of the blade pulley 314 displacement on the drive belt 317 by taking up additional slack in the drive belt 317 extending from the drive pulley 312 towards the counter pulley 316.

Figure 7:
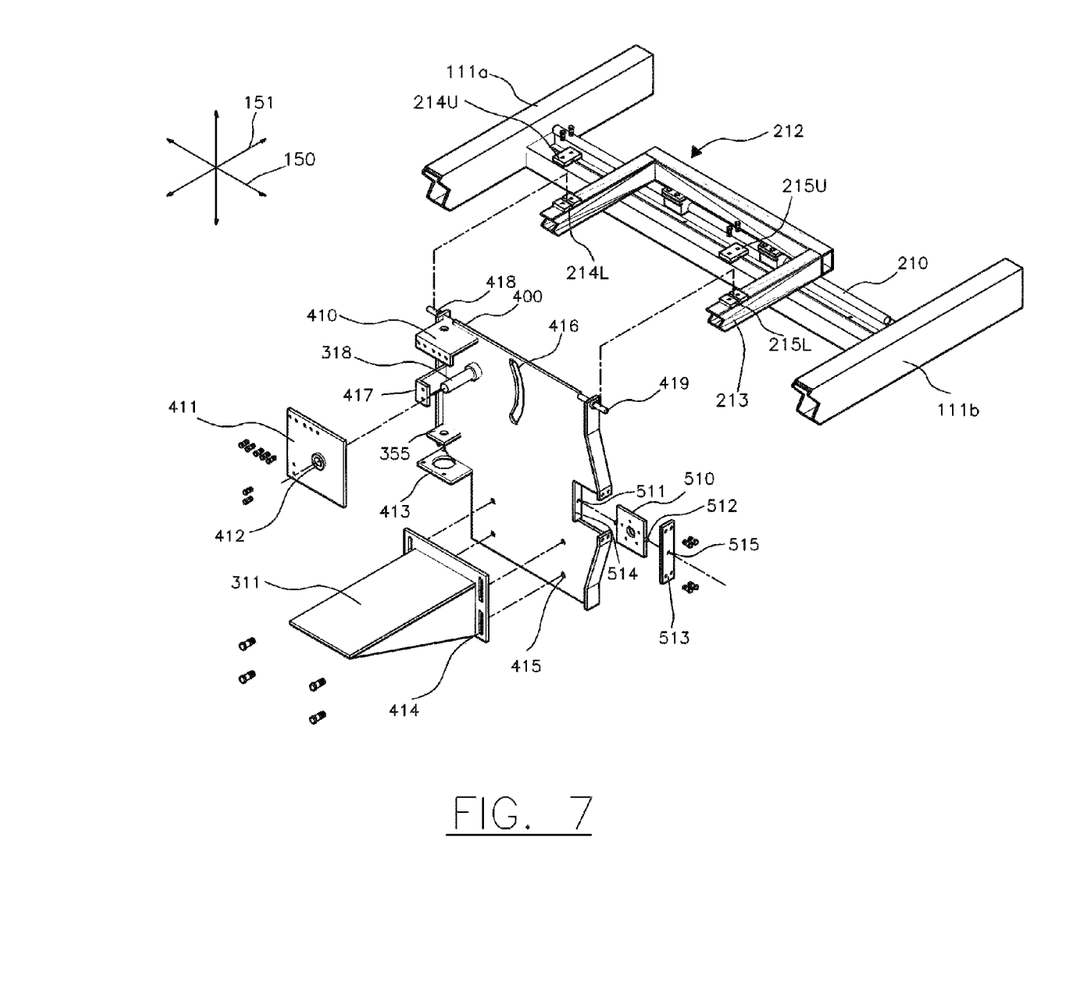
FIG. 7 is a so-called exploded view of the tilt frame and its attached elements that supports the mounting of the blade driving mechanism and tilting mechanism.

Referring now to FIG. 7, the tilt frame 400 and its attached elements supporting the blade drive assembly 300, height adjusting device 350, and tilting mechanism 500 will be described in detail. As best shown in FIG. 7, the tilt frame 400 includes the axle 318 that supports the blade arm 313 and counter arm 315 (see FIG. 5) is fixedly attached to the vertical face of the tilt frame 400 and has a generally horizontal axis perpendicular to the vertical face of the tilt frame 400. A cover plate 411 is fastened to the tilt frame 400 via mounting brackets 410, 417 and has a hole 412 sized to fit the end of the axle 318 to provide support for the free end of the axle 318. The tilt frame 400 further includes a height adjusting motor mounting base 413 fixedly attached to the tilt frame 400 for supporting the height adjusting motor 315, and a drive motor mounting base 311 for the blade driving motor 310 adjustably attached to the tilt frame 400 by fasteners extending horizontally through vertical slots 414 and through plate holes 415. The tilt frame 400 has a curved slotted hole 416 oversized to allow the blade shaft 319 (see FIG. 5) to move in its predetermined range of motion without contacting the tilt frame 400.

A tilting nut coupling plate 510 is pivotally joined to the tilt plate 400 via pivot frames 513 and 514. The pivot frame 513 and 514 have pivot holes 511 and 515, respectively, and are sized to fit pins 512 that are fixedly attached to the coupling base plate 510. The coupling base plate 510 is retained by the pivot frame 513 to the tilt frame 400 by fasteners.

Still referring to the embodiment of FIG. 7, the figure also illustrates the manner in which the tilt frame 400 is mounted on the carriage assembly 212. The tilt frame 400 further includes pins 418 and 419 that are rigidly attached to the top corners of the tilt frame 400. The tilt frame 400 is pivotably mounted on the lower part of the pivot blocks 214L and 215L and retained by the upper part of the pivot blocks 214U and 215U, respectively.

Figure 8A:
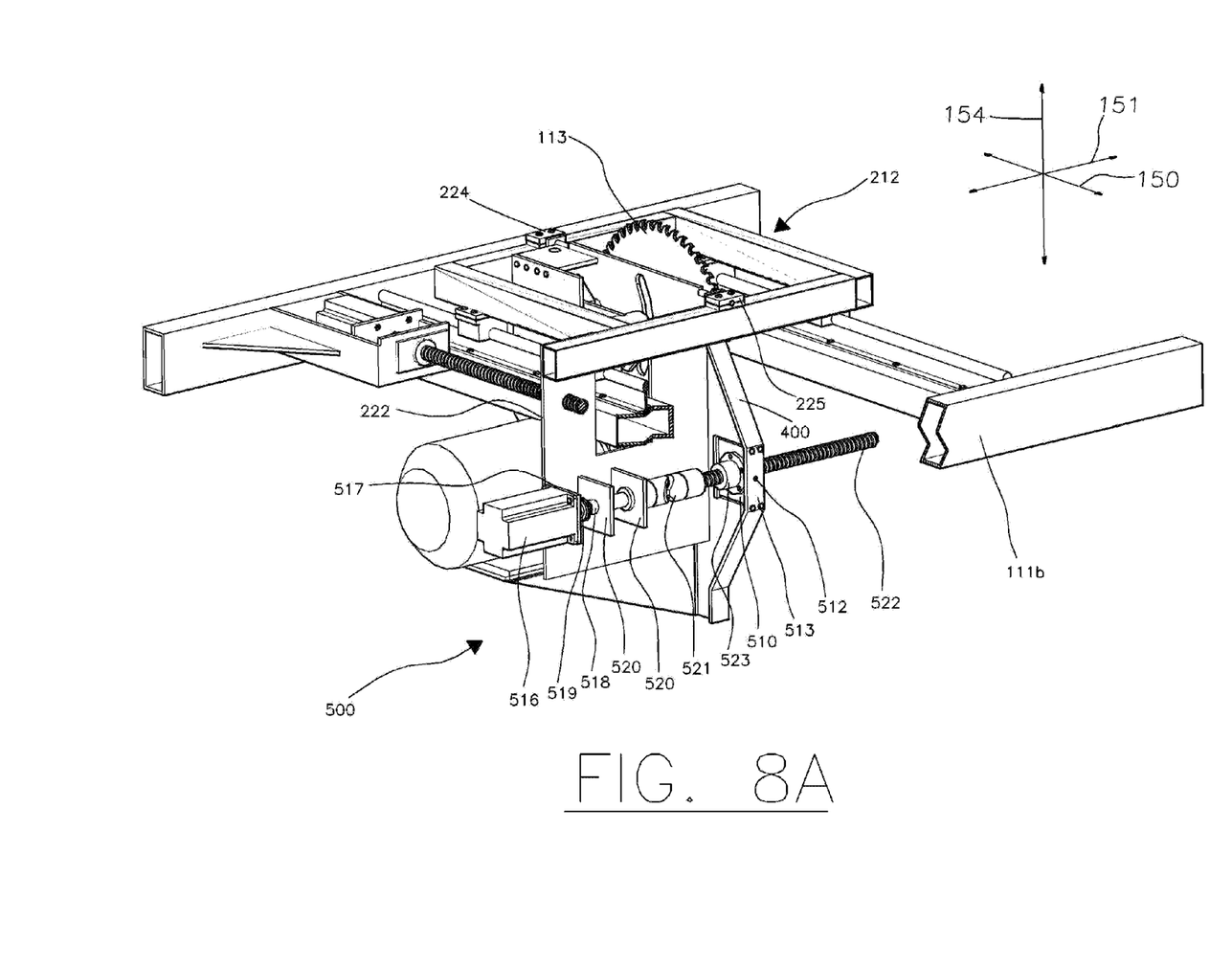
FIG. 8A is a partial perspective view of the tilting mechanism of the table saw shown in FIG. 1, wherein the tilt frame is in its nominal operating position.
Figure 8B:
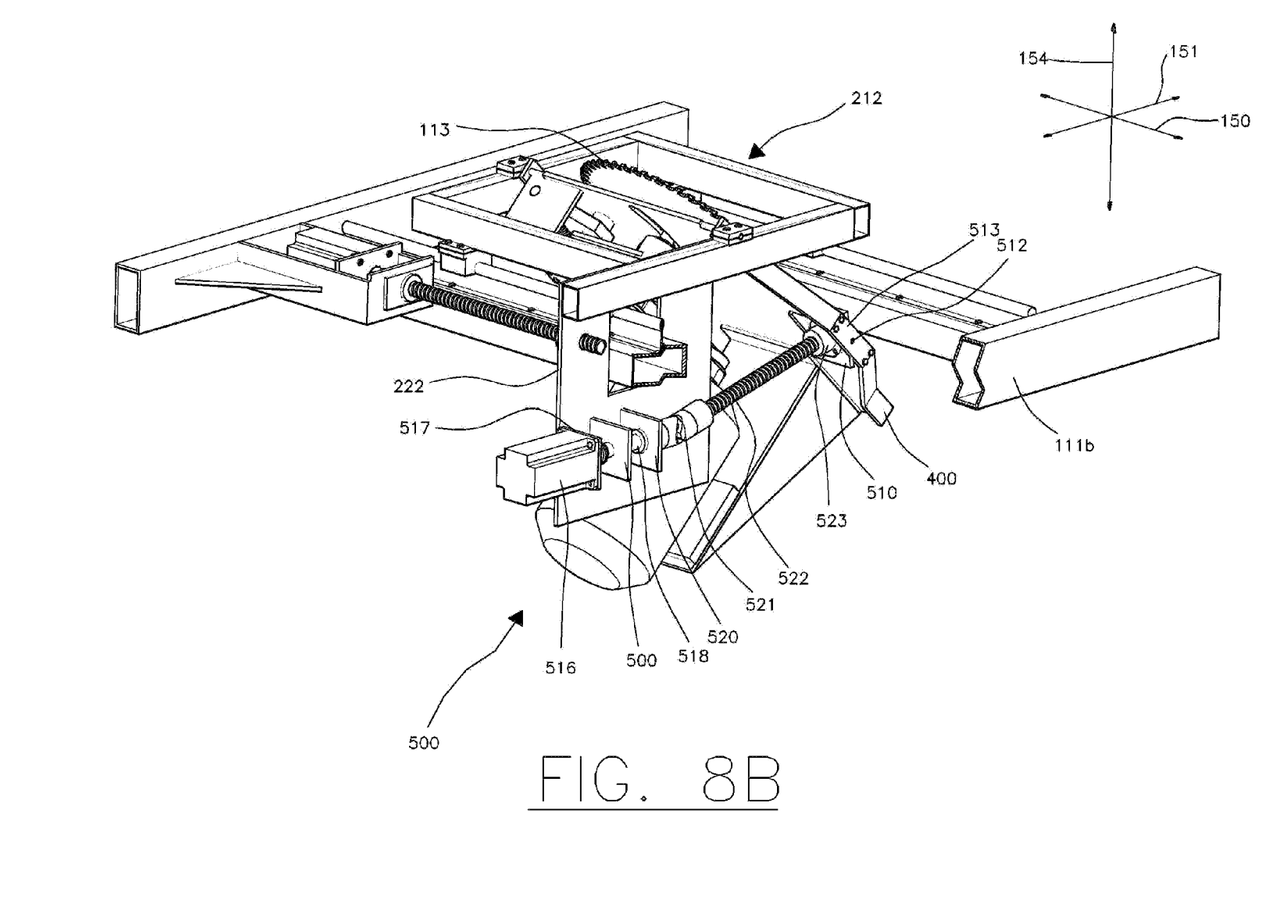
FIG. 8B is a partial perspective view of the tilting mechanism of the table saw shown in FIG. 1, wherein the tilt frame is in an angled position.

Referring now to FIGS. 8A and 8B, the tilting mechanism 500 is shown. The tilting mechanism 500 includes a tilting motor 516, a tilting motor mounting plate 517 rigidly attached to the vertical support plate 222, an intermediate shaft 518 coupled to a output shaft 519 of the tilting motor 516, shaft support mounts 520 for supporting the intermediate shaft 518, a universal joint 521 coupling the intermediate shaft 518 and a tilting threaded rod 522, and a tilting nut 523 fastened to tilting nut coupling plate 510 and threadbly engaged with the tilting threaded rod 522. The tilting mechanism 500 is used to tilt the tilt frame 400 between a nominal operating position, where the tilt plate is generally parallel to the vertical direction 154, shown in FIG. 8A, and at least a forty five degree position away from its nominal operating position, shown in FIG. 8B.

In operation, the tilting motor 516 rotates the tilting threaded rod 522, which in turn, translates the tilting nut 523 along the axis of the tilting threaded rod 522. The tilting motor 516 is selectively reversible so that the tilting threaded rod 522 can be rotated in either direction. The tilting nut 523 is coupled to the tilting nut coupling plate 510, which is pivotally mounted to the tilt frame 400. When the tilting threaded rod 522 rotates, the tilting nut 523 applies a push or a pull on the tilt frame 400 to rotate about its pivot axis, depending on the direction of rotation of the tilting motor 516.

The universal joint 521 and the tilting nut coupling plate 510 are configured to allow the tilting threaded rod 522 axis to gradually incline as the tilt frame 400 rotates away from it nominal operating position and to gradually recline as the tilt frame 400 rotates towards its nominal operating position. The tilting threaded rod 522 and tilting nut 523 acts like a jack screw; so when the tiling motor 516 is in stop, it holds the tilt frame 400 firmly in position.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

The embodiments of the invention in which an exclusive property or privilege is claimed are defined as follows:

1. A blade driving mechanism of a table saw, wherein the table saw comprises a main frame assembly, a work-piece support platform mounted to said main frame assembly and having a saw slot and saw slot axis; and a blade wheel mounted to and driven by said blade driving mechanism disposed under said work-piece support surface; said blade driving mechanism comprising: a) a tilt frame, pivotable about an axis generally parallel to said saw slot axis; b) an electrical motor mounted substantially stationary to said tilt frame; said electrical motor having a drive pulley mounted to its output shaft; c) a belt driving system comprising: (i) a blade arm having a blade pulley rotatably mounted thereto about an axis, said blade pulley connected to a blade wheel shaft for driving the blade wheel to rotate; said blade arm pivotable about a pivot axis fixedly attached to said tilt frame; (ii) a counter arm having a counter pulley rotably mounted thereto about an axis; said counter arm mounted coaxially with said blade arm and pivotable about said pivot axis; and (iii) a drive belt drivingly interconnecting said drive pulley, blade pulley, and counter pulley; and d) a blade height adjusting device configured to raise and lower the blade wheel relative to the work-piece support surface, said height adjusting device comprises a worm gear assembly configured to rotate said blade arm about its pivot axis to raise and lower said blade wheel, a gear of said worm gear assembly is fixedly attached to said blade arm, coaxially mounted to said pivot axis, such that said blade arm and said gear rotate together, a worm of said worm gear assembly is operatively coupled to and driven by a motor that is controllable via a control panel.

2. The blade driving mechanism according to claim 1, wherein a line passing through said blade arm pivot axis and blade pulley axis forms an angle with a line passing through said counter arm pivot axis and counter pulley axis, said angle being almost equal to 90 degrees.

3. The blade driving mechanism according to claim 1, wherein a distance between said blade arm pivot axis and blade pulley axis is generally equal to a distance between said counter arm pivot axis and counter pulley axis.

4. The blade driving mechanism according to claim 1, wherein said blade arm and counter arm are configured to cooperatively rotate in unison such that 1) when rotating said blade arm to raise said blade wheel, the blade pulley takes up additional slack in the drive belt extending from the drive pulley towards the blade pulley and the counter arm rotates to simultaneously counteract the effects of the blade pulley displacement on the drive belt by giving up slack in the drive belt extending from the drive pulley towards the counter pulley, and 2) when rotating said blade arm to lower said blade wheel, the blade pulley gives up slack in the drive belt extending from the drive pulley towards the blade pulley and the counter arm rotates to simultaneously counteract the effects of the blade pulley displacement on the drive belt by taking up additional slack in the drive belt extending from the drive pulley towards the counter pulley.

5. The blade driving mechanism according to claim 1, wherein said blade arm and counter arm are spring-biased which causes said blade arm to apply an opposing force against said counter arm.

6. A blade driving mechanism of a table saw, wherein the table saw comprises a main frame assembly, a work-piece support platform mounted to said main frame assembly and having a saw slot and saw slot axis; and a blade wheel mounted to and driven by said blade driving mechanism disposed under said work-piece support surface; said blade driving mechanism comprising: a) a tilt frame, pivotable about an axis generally parallel to said saw slot axis; b) an electrical motor mounted substantially stationary to said tilt frame; said electrical motor having a drive pulley mounted to its output shaft; c) a belt driving system comprising: (i) a blade arm having a blade pulley rotatably mounted thereto about an axis, said blade pulley connected to a blade wheel shaft for driving the blade wheel to rotate; said blade arm pivotable about a pivot axis fixedly attached to said tilt frame; (ii) a counter arm having a counter pulley rotably mounted thereto about an axis; said counter arm fixedly attached to said blade arm, said counter arm and blade arm pivot together about said pivot axis; and (iii) a drive belt drivingly interconnecting said drive pulley, blade pulley, and counter pulley; and d) a blade height adjusting device configured to raise and lower the blade wheel relative to the work-piece support surface, said height adjusting device comprises a worm gear assembly configured to rotate said blade arm about its pivot axis to raise and lower said blade wheel, a gear of said worm gear assembly is fixedly attached to said blade arm, coaxially mounted to said pivot axis, such that said blade arm and said gear rotate together, a worm of said worm gear assembly is operatively coupled to a hand crank.

7. The blade driving mechanism according to claim 6, wherein a line passing through said blade arm pivot axis and blade pulley axis forms an angle with a line passing through said counter arm pivot axis and counter pulley axis, said angle being almost equal to 90 degrees.

8. The blade driving mechanism according to claim 6, wherein a distance between said blade arm pivot axis and blade pulley axis is generally equal to a distance between said counter arm pivot axis and counter pulley axis.

9. The blade driving mechanism according to claim 6, wherein said counter arm is fixedly attached to said blade arm such that said counter arm rotate in unison with said blade arm such that 1) when rotating said blade arm to raise said blade wheel, the blade pulley takes up additional slack in the drive belt extending from the drive pulley towards the blade pulley and the counter arm rotates to simultaneously counteract the effects of the blade pulley displacement on the drive belt by giving up slack in the drive belt extending from the drive pulley towards the counter pulley, and 2) when rotating said blade arm to lower said blade wheel, the blade pulley gives up slack in the drive belt extending from the drive pulley towards the blade pulley and the counter arm rotates to simultaneously counteract the effects of the blade pulley displacement on the drive belt by taking up additional slack in the drive belt extending from the drive pulley towards the counter pulley.

10. A blade driving mechanism of a table saw, wherein the table saw comprises a main frame assembly, a work-piece support platform mounted to said main frame assembly and having a saw slot and saw slot axis; and a blade wheel mounted to and driven by said blade driving mechanism disposed under said work-piece support surface; said blade driving mechanism comprising: a) a tilt frame, pivotable about an axis generally parallel to said saw slot axis; b) an electrical motor mounted substantially stationary to said tilt frame; said electrical motor having a drive pulley mounted to its output shaft; c) a belt driving system comprising: (i) a blade arm having a blade pulley rotatably mounted thereto about an axis, said blade pulley connected to said blade wheel for driving the blade wheel to rotate; said blade arm pivotable about a pivot axis fixedly attached to said tilt frame; (ii) a counter arm having a counter pulley rotably mounted thereto about an axis; said counter arm mounted coaxially with said blade arm and pivotable about said pivot axis; and (iii) a drive belt drivingly interconnecting said drive pulley, blade pulley, and counter pulley; d) a blade height adjusting device configured to raise and lower the blade wheel relative to the work-piece support surface, said height adjusting device comprises a worm gear assembly configured to rotate said blade arm about its pivot axis to raise and lower said blade wheel, a gear of said worm gear assembly is fixedly attached to said blade arm, coaxially mounted to said pivot axis, such that said blade arm and said gear rotate together, a worm of said worm gear assembly is operatively coupled to and driven via a hand crank.

11. The blade driving mechanism according to claim 10, wherein a line passing through said blade arm pivot axis and blade pulley axis forms an angle with a line passing through said counter arm pivot axis and counter pulley axis, said angle being almost equal to 90 degrees.

12. The blade driving mechanism according to claim 10, wherein a distance between said blade arm pivot axis and blade pulley axis is generally equal to a distance between said counter arm pivot axis and counter pulley axis.

13. The blade driving mechanism according to claim 10, wherein said blade arm and counter arm are configured to cooperatively rotate in unison such that 1) when rotating said blade arm to raise said blade wheel, the blade pulley takes up additional slack in the drive belt extending from the drive pulley towards the blade pulley and the counter arm rotates to simultaneously counteract the effects of the blade pulley displacement on the drive belt by giving up slack in the drive belt extending from the drive pulley towards the counter pulley, and 2) when rotating said blade arm to lower said blade wheel, the blade pulley gives up slack in the drive belt extending from the drive pulley towards the blade pulley and the counter arm rotates to simultaneously counteract the effects of the blade pulley displacement on the drive belt by taking up additional slack in the drive belt extending from the drive pulley towards the counter pulley.

14. The blade driving mechanism according to claim 10, wherein said blade arm and counter arm are spring-biased which causes said blade arm to apply an opposing force against said counter arm.

* * * * *